United States Patent

Link

[11] Patent Number: 6,125,569
[45] Date of Patent: Oct. 3, 2000

[54] SKIRT BANDING TOOL

[76] Inventor: Donald Link, 1053 Legion St., Shakopee, Minn. 55379

[21] Appl. No.: 09/082,178

[22] Filed: May 20, 1998

[51] Int. Cl.[7] .................................................. A01K 97/00
[52] U.S. Cl. ........................................ 43/4; 43/1; 43/42.53
[58] Field of Search .................................. 43/1, 4, 42.53; 289/17; 223/111

[56] References Cited

U.S. PATENT DOCUMENTS

| D. 231,454 | 4/1974 | Bloch | D22/3 |
|---|---|---|---|
| 3,164,067 | 1/1965 | Hurst | 43/4 |
| 3,271,890 | 9/1966 | Davis | 43/4 |
| 3,975,853 | 8/1976 | Aaron | 43/4 |
| 4,129,955 | 12/1978 | Schommer | 43/4 |
| 4,674,220 | 6/1987 | Bearce | 43/4 |
| 4,765,082 | 8/1988 | Nichlos | 43/4 |
| 4,979,326 | 12/1990 | Aaron | 43/4 |
| 5,640,797 | 6/1997 | Muse | 43/42.53 |
| 5,657,572 | 8/1997 | Little | 43/4 |
| 5,735,071 | 4/1998 | Gouldie | 43/4 |

*Primary Examiner*—Kurt Rowan
*Attorney, Agent, or Firm*—D. L. Tschida

[57] ABSTRACT

A portable tool for mounting annular elastic bands to multiple strands of a skirted fishing lure accessory. A band support provides a barrel having an outer surface that flares outward as it extends from an apex. A retractor rod having a "J" shaped end is concentrically supported from the apex in a longitudinal bore of the barrel and extends aft of the barrel. Upon fitting a band onto the barrel, the rod can be extended and such that the hooked end can catch a border of one or more skirt blanks. With the withdrawal of the rod and blank into the barrel, the band can be manipulated onto the strands of the skirt blank. The borders can then be trimmed from the skirt.

5 Claims, 4 Drawing Sheets

SKIRT BANDING TOOL

BACKGROUND OF THE INVENTION

The present invention relates to fishing lures and, in particular, to a tool for banding multi-stranded elastomer skirts.

A dressing commonly mounted to fishing lures such as jigs or "spinner baits" or "buzz baits" is a multi-stranded skirt. The skirts are typically fabricated from sheets of an elastomer material, such as rubber or silicone rubber. A sheet is partitioned into a number of regions that are processed into individual skirts. Each skirt is defined by a multiplicity of slits that form strands. The strands are attached between solid bands that border the ends of the strands. The skirts are cut from the sheets with the borders attached. The strands are contained by the borders, until the strands are bound together. A rubber band typically secures the strands together.

The borders are not typically cut from the strands until the strands are banded. The skirt is then ready to be mounted to a desired lure. Banded skirts, which are sold to original equipment manufacturers and as after market components to the fisherman, do not normally contain the borders.

The rubber band is also used to attach one or more of the skirts to an appendage of the foregoing fishing lures. The skirts can have the same or different colors and/or surface treatments. Both lure types include a molded lead head. Spinner baits also typically include a formed wire that protrudes from the head or body and supports one or more metal blades that spin and vibrate as the lure is retrieved. A fishing line is attached to the wire or can be attached to an eye at the hook. As the lures are retrieved, the strands or filaments of the skirt undulate with movement of the lure through water and entice the strike of a prey species of fish.

Examples of banded skirts can be found at U.S. Pat. Nos. 4,640,041 and 5,251,395.

The bands are attached to the skirts in factory settings with assembly jigs that contain the skirt and permit the manipulation of one of a number of bands onto each skirt. The jigs are designed to accommodate volume production. Applicant is unaware of any portable jig to bind the strands of a skirt, especially one intended for use in a boat.

Examples of another skirt style or "rollup" skirt are shown at U.S. Pat. Nos. 5,517,782 and 5,709,047. Rollup skirts are formed by rolling and bonding the border of a skirt to a tubular, elastomer core piece with an appropriate adhesive. The cut ends of the strands trail from the core piece. A bore in the core piece stretches and mounts to the lure.

Skirts bound with rubber bands are frequently found in the after market as replacements for skirts that tear or become damaged. Skirts may also discolor from exposure to ultraviolet light, contaminants in the water or tackle box, or age. A fisher person may carry a supply of different colored skirts to doctor his or her lures. That is, the fisher person may want to tailor the appearance of a lure to produce a specific presentation commensurate to the fishing conditions. The fisher person must therefore carry a relatively large supply of skirts for a variety of colors. This can be costly and require a stock beyond normally needs.

As an alternative, the present invention provides a portable tool that a fisher person may use while fishing to construct a skirt of a preferred color scheme. The tool of the invention provides a low-cost, portable device that can be carried by the fisher person in a pocket. The tool is readily carried in a shirt pocket or tackle box and allows a fisher person to manufacture his or her own skirts. The tool facilitates the banding of skirt blanks of various colors or having strands of different lengths and shapes to be banded together and attached to a lure of choice to obtain a personally preferred presentation.

SUMMARY OF THE INVENTION

It is accordingly a primary object of the invention to provide a portable tool for banding the strands or one or more multi-stranded fishing skirts.

It is a further object of the invention to band skirts by fitting a band to a support, positioning a portion of the skirt in relation to a sheltered portion of the support and manipulating the band onto the skirt.

It is a further object of the invention to provide a band support having outer walls that taper outward from a forward end and fitted with a retractor rod that extends and retracts relative to the band support.

It is a further object of the invention to provide a retractor rod with a hooked end.

It is a further object of the invention to provide a retractor rod that is concentrically mounted to the hollow core of a tubular support that tapers to small bore at a forward end of the support.

Various of the foregoing objects, advantages and distinctions of the invention are obtained in a presently preferred tool wherein a cylindrical, hollow support provides outer walls of a barrel that taper or flare outward from a forward apex. One or more bands mount at the apex and can be rolled or maneuvered aft along the barrel.

A retractor rod having a hooked end is concentrically supported in a bore that extends through the barrel from the apex. The rod is reciprocally mounted to capture and draw a portion of the skirt into the barrel. The band can then be manipulated off the barrel and onto the skirt.

Still other objects, advantages, distinctions and constructions of the invention will become more apparent from the following description with respect to the appended drawings. Similar components and assemblies are referred to in the various drawings with similar alphanumeric reference characters. The description should not be literally construed in limitation of the invention. Rather, the invention should be interpreted within the broad scope of the further appended claims.

DESCRIPTION OF THE PREFERRED EMBODIMENT

Figure 1:
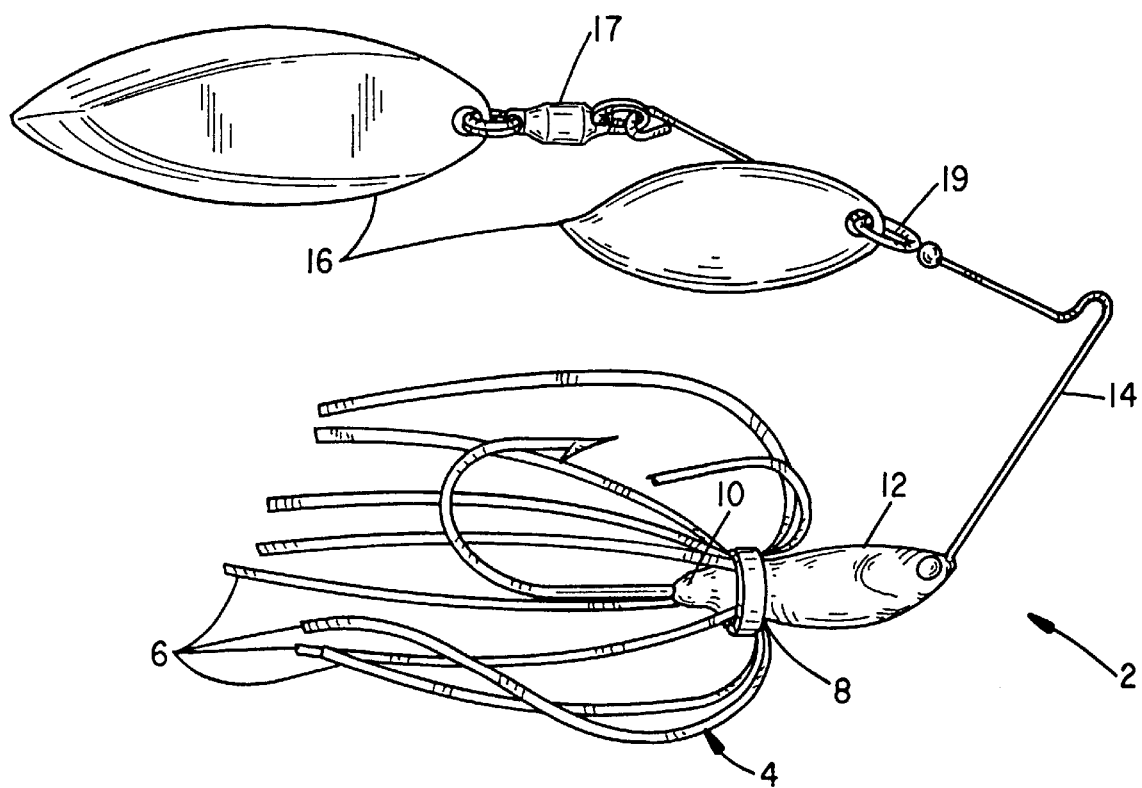
FIG. 1 is a plan drawing to typical spinner bait fitted with a banded skirt.
Figure 2:
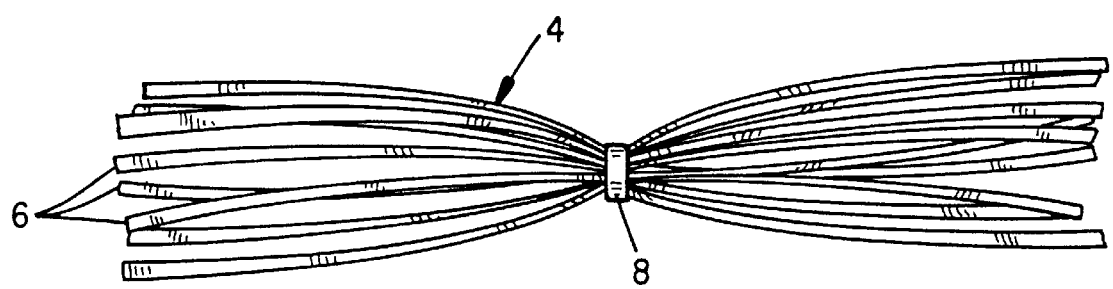
FIG. 2 is a plan view of a typical banded skirt.

Referring to FIG. 1, a perspective drawing is shown to a typical spinner bait 2 that is fitted with a skirt 4. A detailed drawing of the skirt 4 is shown in FIG. 2 as it appears when detached from the lure 2. The skirt 4 includes a number of strands 6 that are bound together with a band 8. The number, coloration and or surface ornamentation of the strands 6 can be varied as desired. The length and shape of the strands 6 can also be varied. The strands 6 are preferably formed from an elastomer material, such as rubber or silicone rubber, although could be constructed from other materials, such as plastic or polymers.

The band 8 is typically formed from an elastomer material, although could also be constructed of a variety of materials. Preferably, however, the band 8 is elastic so that it can expand and contract to secure the skirt 4 to the contours of an appendage 10 of the lure head or body 12. A formed wire 14 projects from the body 12 and supports a pair of spinner blades 16. The spinner blades 16 are secured to the wire 14 with swivels 17 and/or clevises 19. The blades 16 are formed from metal and rotate and flutter, along with the strands 6, with lure movement. The number and mounting of the blades 16 can also be varied as desired.

The lure 2 can alternatively be constructed as a jig (not shown). In this instance, the lure would appear without the formed wire 14 and blades 16.

Figure 3:
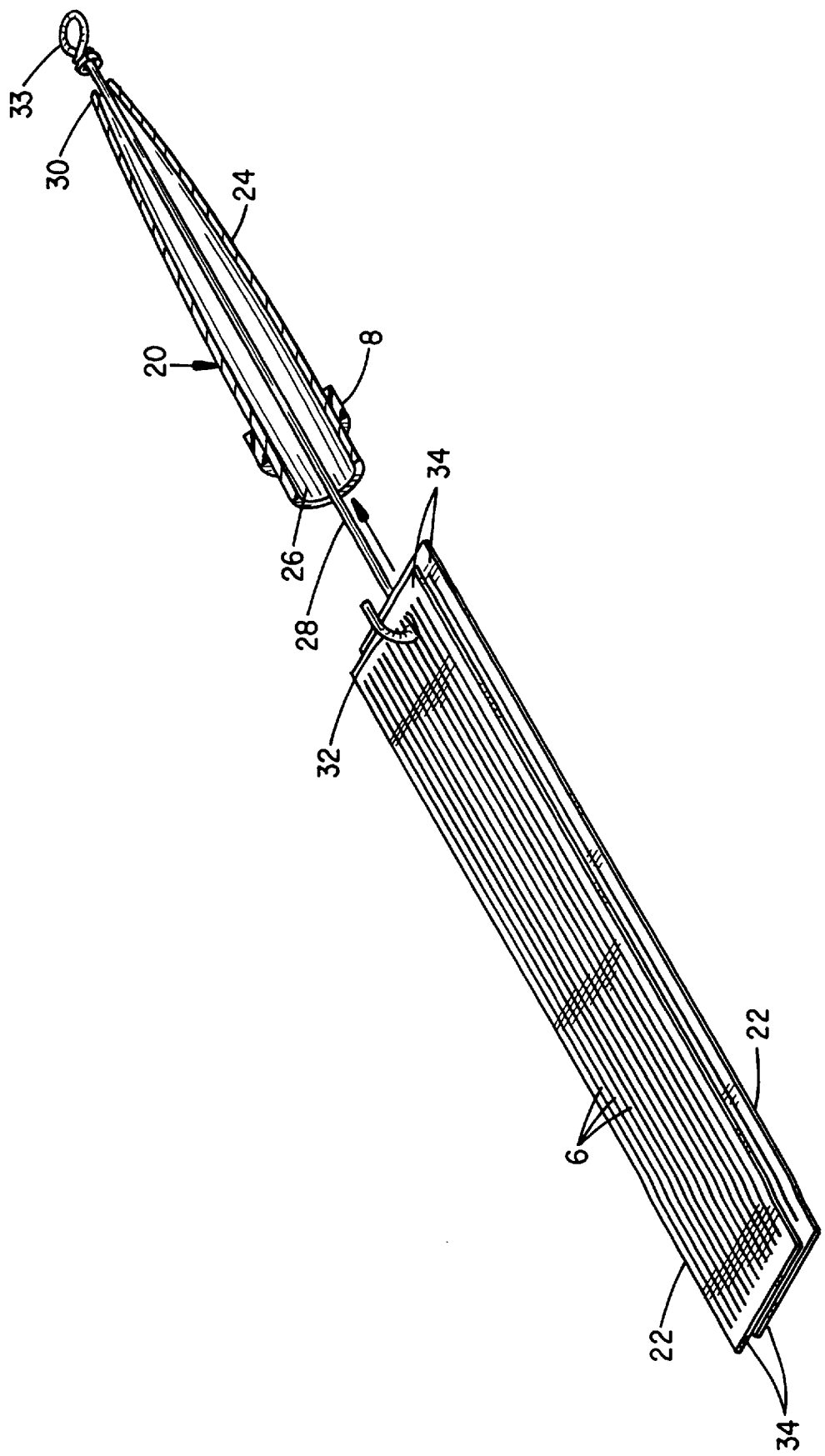
FIG. 3 is a cross section view through the tool of the invention fitted to a pair of pre-slit skirts and wherein the strands are still bound to the border pieces.
Figure 4:
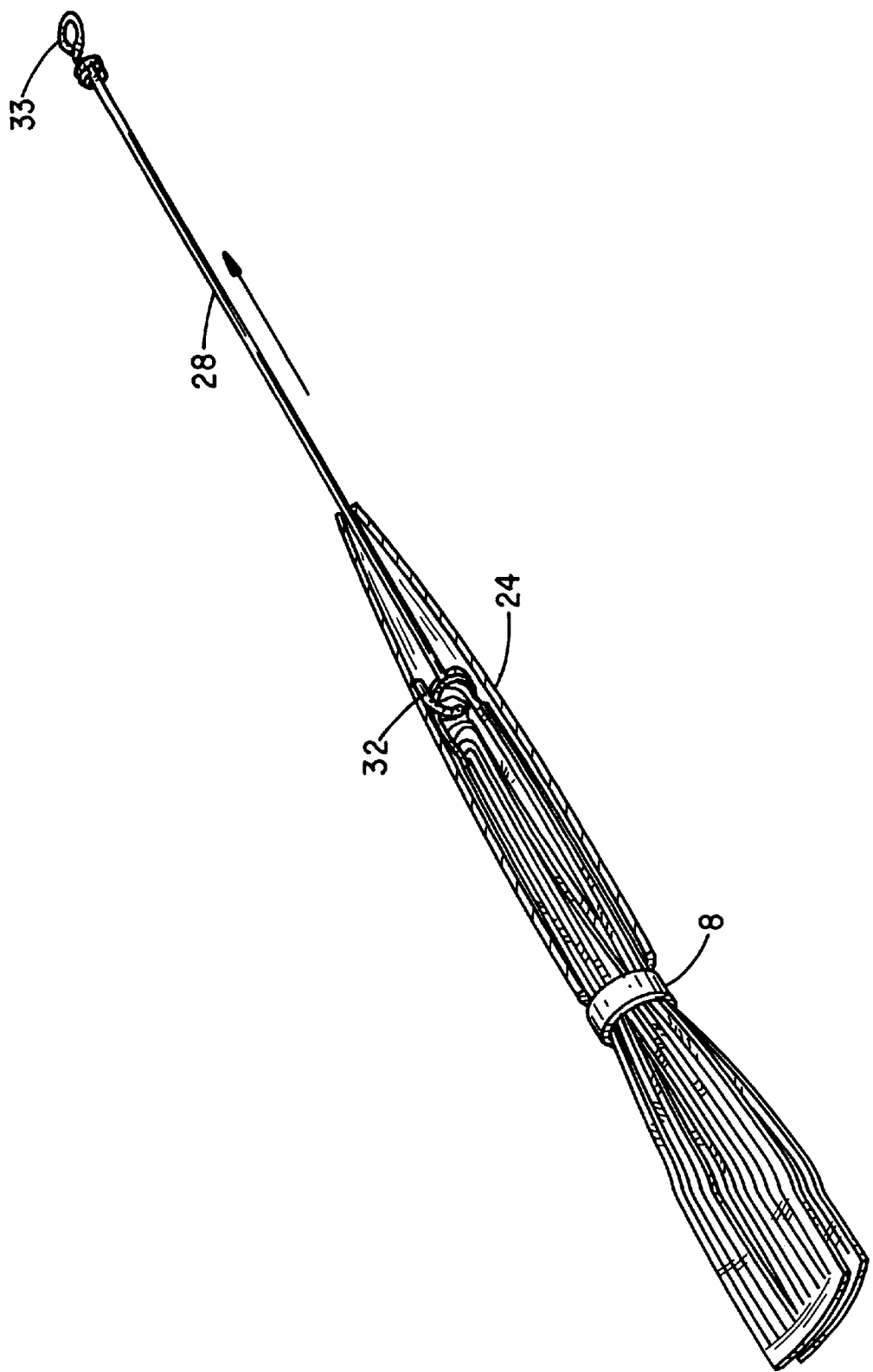
FIG. 4 is a cross section view through the skirts after being drawn into the fitting tool and the band is manipulated onto the skirts.

Regardless of construction, the lure 2 is typically purchased with a skirt 4. Over time and with use, the skirt 4 frequently is damaged and requires replacement. Alternatively, a fisher person may want to change the appearance of the lure 2 by changing the skirt 4. For such instances, FIGS. 3 and 4 show views to a portable tool 20 that can be used to band one or more skirt blanks 22 into a desired skirt 4.

The tool 20 includes a barrel 24 that has a hollow bore 26. A retractor rod 28 is concentrically supported to an apex 30 of the barrel 24. A hook end 32 of the rod 28 trails from the aft end of the barrel 24 and an eye or hand grip 33 extends from the apex 30. A reciprocating movement of the rod 28 causes the hook 32 to extend and retract relative to the barrel 24.

The hook 32 is shaped to grip a skirt blank at an end border 34 and draw the skirt blank 22 into the barrel 24. The blank 22 is typically drawn approximately one-half its length into the barrel 24 to assure that a band 8 supported to the outer surface of the barrel 24 mounts to the center of the blank 22. The length of the barrel 24 can be sized to assure that half the length of the blank 22 is drawn into the barrel 24 before the hook 32 bottoms. The user is thereby assured the band 8 will be mounted close to the center of the blank 22. Once the band 8 is fitted to the blank 22, the blank 22 can be mounted to the lure 2 and the borders 34 can be trimmed away from the skirt 8.

Although one construction of the tool 20 is shown, others are possible. For example, the barrel 24 can exhibit other elongate shapes and may have open side walls. That is, the barrel walls may appear as ribs with intervening spaces. The barrel walls may also extend only partially around the sides, such as if a lengthwise portion of the barrel were removed as shown in FIG. 3. In the latter instance, the rod 28 may not be required, depending upon the size and shape of the walls. Preferably, the barrel 24 should shelter a portion of a skirt blank 22 and support one or more bands 8 to the barrel 24 and spread the bands 8 sufficiently to clear a portion of the blank 22 covered by the barrel 24 as the band 8 is manipulated into position.

While the invention has been described with respect to a preferred construction and considered improvements or alternatives thereto, still other constructions may be suggested to those skilled in the art. The foregoing description should therefore be construed to include all those embodiments within the spirit and scope of the following claims.

What is claimed is:

1. A fishing skirt banding tool, comprising:
    a) a barrel member having longitudinal walls that define an outer surface that tapers outward as it extends from an apex to a distal end and wherein a longitudinal bore extends from said apex through said barrel member; and
    b) a rod having a hooked bend at one end and a hand hold at an opposite end, wherein said rod is secured to said barrel member at said apex and said hand hold is displaced from said apex for controlling reciprocating longitudinal movements of said hooked end relative to said bore, wherein a diameter of said hooked end bend is greater than a diameter of said apex and smaller than a diameter of said distal end whereby an elastic annular band can be manipulated over said hand hold and said apex and along the outer surface of the barrel member to mount about a multi-stranded skirt blank drawn by the hooked bend into the bore.

2. A tool as set forth in claim 1 wherein said rod is longer than said barrel member.

3. A tool as set forth in claim 2 wherein said hooked bend exhibits a J shape and wherein the rod is concentrically supported to said barrel member.

4. A tool as set forth in claim 1 wherein an eyelet formed into said rod defines said hand hold.

5. A fishing skirt banding tool, comprising:
    a) a tubular barrel member having an outer surface that tapers outward as it extends from an apex to a distal end and wherein a longitudinal bore extends through said barrel member from said apex to said distal end; and
    b) a rod having a hooked bend at one end and a hand hold at an opposite end, wherein said rod is concentrically secured to said barrel member at said apex and said hand hold is displaced from said apex for controlling reciprocating longitudinal movements of said hooked end relative to said distal end, wherein a diameter of said hooked end bend is greater than a diameter of said apex and smaller than a diameter of said distal end whereby an elastic annular band can be manipulated over said hand hold and said apex and along the outer surface of the barrel member to mount about a multi-stranded skirt blank drawn by the hooked bend into the bore.

* * * * *